United States Patent
Rogers et al.

(10) Patent No.: US 10,348,943 B2
(45) Date of Patent: Jul. 9, 2019

(54) ELECTRONIC DEVICE STRUCTURES WITH OLEOPHOBIC COATINGS

(71) Applicant: Apple Inc., Cupertino, CA (US)

(72) Inventors: Matthew S. Rogers, San Jose, CA (US); Naoto Matsuyuki, Tokyo (JP); Que Anh S. Nguyen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 15/218,768

(22) Filed: Jul. 25, 2016

(65) Prior Publication Data
US 2018/0027150 A1   Jan. 25, 2018

(51) Int. Cl.
  *H05K 7/00*   (2006.01)
  *G11B 33/02*   (2006.01)
  *H04N 5/225*   (2006.01)

(52) U.S. Cl.
  CPC ................................. *H04N 5/2252* (2013.01)

(58) Field of Classification Search
  CPC .................................. H05K 7/14; H05K 7/00
  USPC ..................................................... 361/679.01
  See application file for complete search history.

(56) References Cited

U.S. PATENT DOCUMENTS

| 2003/0003687 | A1* | 1/2003 | Yanagita | H01L 21/67092 438/458 |
| 2005/0219399 | A1* | 10/2005 | Sato | H04N 5/2253 348/340 |
| 2009/0197048 | A1 | 8/2009 | Amin et al. | |
| 2014/0011013 | A1 | 1/2014 | Jin et al. | |
| 2014/0087197 | A1* | 3/2014 | Weber | G02B 1/105 428/432 |
| 2015/0374610 | A1* | 12/2015 | Guittard | A61Q 17/00 424/401 |
| 2016/0002099 | A1* | 1/2016 | Manz | C03C 17/3417 428/212 |
| 2016/0194521 | A1 | 7/2016 | Wilczek | |

FOREIGN PATENT DOCUMENTS

DE   102011076754   12/2012
JP   5309489   10/2013

* cited by examiner

*Primary Examiner* — Jerry Wu
(74) *Attorney, Agent, or Firm* — Treyz Law Group, P.C.; G. Victor Treyz; David K. Cole (57) ABSTRACT

An electronic device may have components such as a display, a camera, a button, and other electrical components. A transparent crystalline member such as a layer of aluminum oxide, zirconium oxide, or other crystalline dielectric structure may overlap an electrical component and may serve as a display cover layer, button cover member, or window member. An annealed adhesion layer such as an annealed inorganic layer may be formed on a crystalline dielectric member. The annealed adhesion layer may help adhere an oleophobic coating to the transparent crystalline member.

18 Claims, 6 Drawing Sheets

ELECTRONIC DEVICE STRUCTURES WITH OLEOPHOBIC COATINGS

BACKGROUND

This relates generally to oleophobic coatings, and, more particularly, to oleophobic coatings for structures in electronic devices.

Electronic devices such as cellular telephones, computers, watches, and other devices contain transparent members such as display cover layers and camera windows. Button members may also sometimes have transparent portions. For example, a menu button in a cellular telephone may have a sapphire cap.

Transparent members in electronic devices may be subject to undesired smudges when contacted by a user's fingers or other external objects. To reduce smudging, these structures may be coated with oleophobic coatings.

Challenges can arise, however, when adding an oleophobic coating to a structure in an electronic device. Unless care is taken, oleophobic material may adhere poorly and the resulting oleophobic coating may be insufficiently robust to withstand normal device handling without damage.

SUMMARY

An electronic device may have components such as a display, a camera or other light-based component, a button, and other electrical components. A transparent crystalline member such as a layer of aluminum oxide, zirconium oxide, or other crystalline dielectric structure may overlap an electrical component. The transparent crystalline member may, as an example, serve as a display cover layer, a button cover member, or a window member.

The transparent crystalline member may be provided with an oleophobic coating. The oleophobic coating may be formed from a fluoropolymer such as perfluoropolyether.

To help adhere the oleophobic coating to the transparent crystalline member, an annealed adhesion layer may be formed on the transparent crystalline member. The annealed adhesion layer may include an inorganic material such as silicon oxide. The annealed adhesion layer may be formed from a single material such as silicon oxide or may be formed from a graded mixture of two different materials (e.g., aluminum oxide and silicon oxide, zirconium oxide and silicon oxide, etc.).

DETAILED DESCRIPTION

Electronic devices and other items may be provided with structures formed from crystalline materials (e.g., dielectric crystalline materials). These structures, which may be transparent, may be used as display cover layers, windows for light-based components such as cameras, button caps, and other structures. Oleophobic coatings may be formed on the structures to reduce smudges. Illustrative configurations in which oleophobic coatings are provided on transparent members for electronic devices such as transparent crystalline members for displays, windows for cameras and other light-based devices, and buttons, may sometimes be described herein as an example. In general, however, oleophobic coatings may be formed on any suitable electronic device structures.

Figure 1:
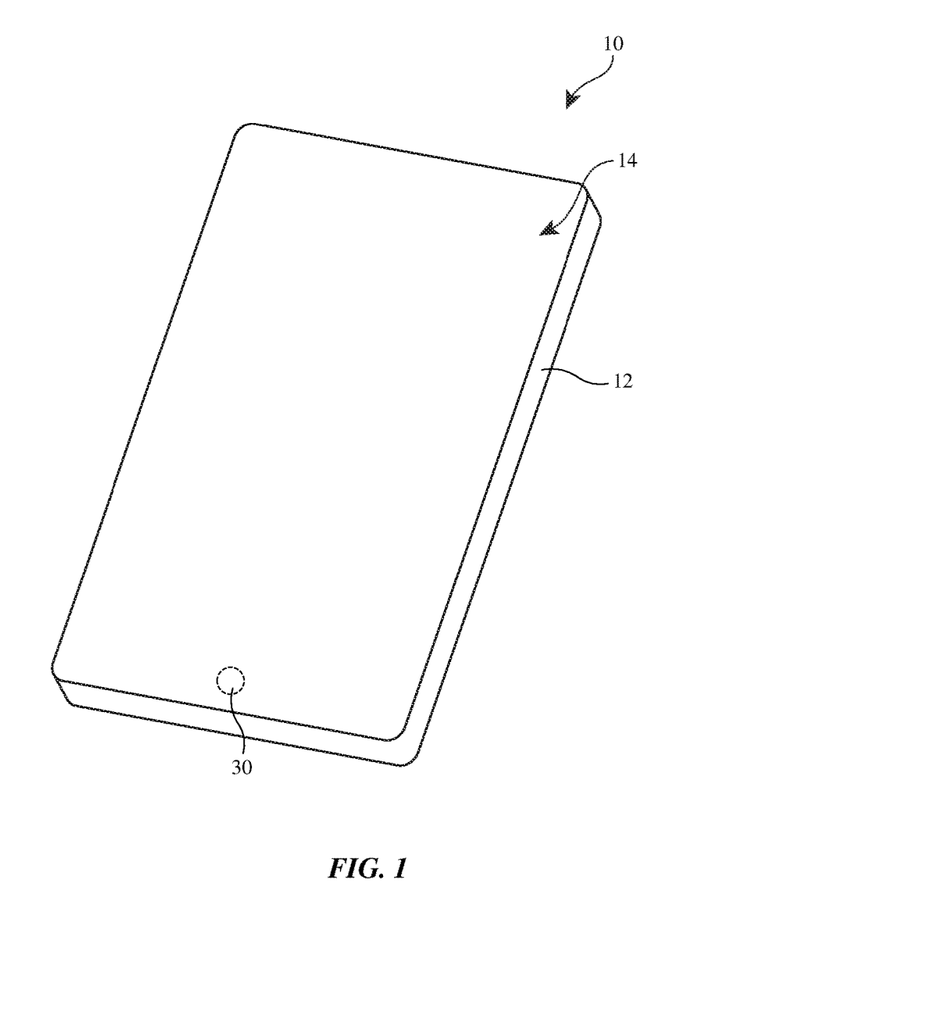
FIG. 1 is a perspective view of an illustrative electronic device of the type that may include structures with oleophobic coatings in accordance with an embodiment.

An illustrative electronic device of the type that may be provided with crystalline members having oleophobic coatings is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies.

Display 14 may include one or more layers of transparent material. For example, the outermost layer of display 14, which may sometimes be referred to as a display cover layer may overlap one or more inner layers (sometimes referred to as a display module) that form the array of pixels. The display cover layer may be formed from a hard transparent material help protect display 14 from damage. Illustrative configurations in which a display cover layer and other transparent members in device 10 (e.g., windows for cameras and other light-based devices and capping layers for buttons) are formed from a transparent crystalline material such as sapphire (sometimes referred to as corundum or crystalline aluminum oxide) or a transparent crystalline material such as zirconium oxide may be described herein as an example. Sapphire and zirconium oxide are hard and therefore scratch resistant. Accordingly materials such as sapphire and zirconium oxide may be satisfactory for use in display cover members, camera window members, and button cover members. In general, however, these transparent members may be formed from any suitable material.

A display cover layer for display 14 may planar or curved and may have a rectangular outline, a circular outline, or outlines of other shapes. If desired, openings may be formed in the display cover layer. For example, an opening may be formed in the display cover layer to accommodate a button (e.g., a button in illustrative button location 30 of FIG. 1), a speaker port, or other component. Openings may be formed in housing 12 to form communications ports (e.g., an audio jack port, a digital data port, etc.), to form openings for buttons, or to form audio ports (e.g., openings for speakers and/or microphones).

Oleophobic coatings and other layers (e.g., antiscratch layers, antireflection layers, etc.) may be formed on display cover layers, camera windows, and button cover layers to help reduce fingerprint smudging. To help ensure adequate adhesion between a transparent crystalline structure in device 10 and oleophobic coating material, an adhesion layer may be formed between the transparent crystalline structure and the oleophobic coating. The adhesion layer may be formed from an inorganic material such as silicon oxide, from a mixture of inorganic materials (e.g., aluminum oxide and silicon oxide when the underlying transparent crystalline layer is formed from aluminum oxide, zirconium oxide and silicon oxide when the underlying transparent crystalline layer is formed from zirconium oxide, etc.), or other suitable materials. The adhesion layer may be annealed to densify the adhesion layer and to enhance smoothness, thereby enhancing the robustness of the adhesion layer and oleophobic coating.

Figure 2:
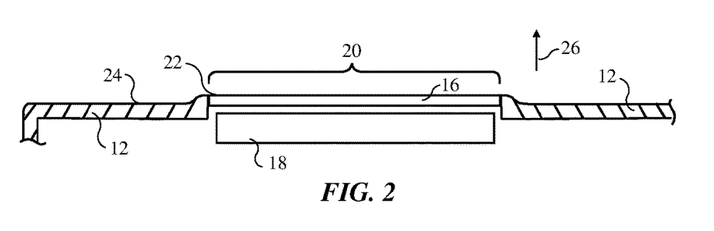
FIG. 2 is a cross-sectional side view of an illustrative electronic device window such as a camera window that may be provided with an oleophobic coating in accordance with an embodiment.

A cross-sectional side view of an illustrative window in a portion of device 10 is shown in FIG. 2. As shown in FIG. 2, device 10 may have housing 12. Light-based component 18 may be mounted in alignment with opening 20 in housing 12. Opening 20 may be circular, may be rectangular, may have an oval shape, may have a triangular shape, may have other shapes with straight and/or curved edges, or may have other suitable shapes (outlines when viewed from above). Window 16 may be mounted in opening 20 of housing 12 so that window 16 overlaps component 18. A gasket, bezel, adhesive, screws, or other fastening mechanisms may be used in attaching window 16 to housing 12. Surface 22 of window 16 may lie flush with surface 24 of housing 12, may be recessed below surface 24, or may, as shown in FIG. 2, be proud of surface 24 (i.e., surface 22 may lie in a plane that is some distance away from surface 24 in direction 26). Surface 24 may form the rear face of housing 12 or other suitable portion of housing 12.

Light-based device 18 may be based on one or more components that emit light (e.g., a light-emitting diode, a laser, a lamp, etc.) and/or one or more components that detect light (e.g., an image sensor that captures digital images through a lens, a proximity sensor detector that measures infrared light from an infrared emitter that has reflected off of external objects adjacent to device 10, an ambient light sensor that measures the intensity and/or color of ambient light, or other light producing and/or light measuring circuitry). With one illustrative configuration, window 16 is a circular window and device 18 includes a rectangular image sensor and a lens that is interposed between the circular window and the rectangular image sensor. Other types of light-based devices may be aligned with windows such as illustrative window 16 of FIG. 2. The configuration of FIG. 2 is merely illustrative.

Figure 3:
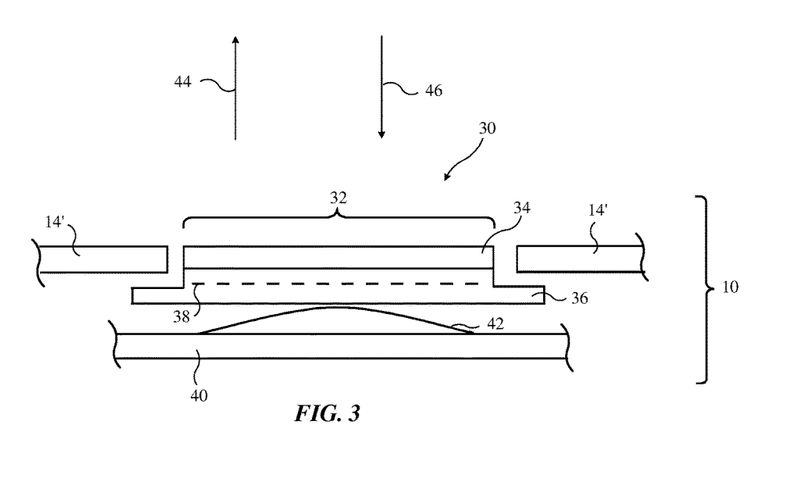
FIG. 3 is a cross-sectional side view of an illustrative button of the type that may be provided with an oleophobic coating in accordance with an embodiment.

FIG. 3 is a cross-sectional side view of an illustrative component such as a button for device 10. Button 30 may be located within an opening in housing 12, in a portion of display 14 (e.g., in an inactive portion of display 14 as shown by illustrative button 30 of FIG. 1), or in other portions of device 10. As shown in FIG. 3, display cover layer 14' (e.g., a layer of glass, sapphire, or other material that overlaps a display component such as a liquid crystal display module, organic light-emitting display module, etc.) may have an opening such as opening 32. Button 30 may have a movable button member such as button member 36. A capacitive touch sensor array that serves as a fingerprint sensor (e.g., sensor 38) may be formed on, under, or within button member 36.

Button member 36 may be formed from plastic and/or other materials and may move in direction 44 when pressed by the finger of a user. When moved in direction 44, button member 36 may compress a switch such as dome switch 42. Dome switch 42 may be mounted on printed circuit 40 or other suitable support structure. When dome switch 42 is compressed inwardly in direction 44, control circuitry that is coupled to dome switch 42 may detect a button press event. When compressed, dome switch 42 may exhibit a restoring force that biases member 36 upwards in direction 46. If desired, supplemental biasing structures (foam, springs, etc.) may be used to bias button member 36 in direction 46. If desired, button member 36 may have different shapes and sizes. The example of FIG. 3 is merely illustrative.

As shown in FIG. 3, button 30 may be overlapped by a transparent member such as button cover member 34. For example, button cover member (layer) 34 may be mounted on the surface of button member 36. Button cover member 34, which may sometimes be referred to as a button cap or button cover layer, may be formed from a crystalline material such as sapphire, zirconium oxide, or other transparent crystalline material. During operation, a user may place a finger on the surface of member 34 so that fingerprint sensor 38 may capture the user's fingerprint. Printed ink (e.g., white ink, black ink, etc.) may be formed on the underside of button cover member 34 to provide button 30 with a desired appearance. For example, the underside of button cover member 34 may be provided with printed ink having the pattern of a menu button icon.

A user's finger is often in contact with member 34 of button 30 (e.g., so that the user may actuate button 30), is often in contact with cover layer 14' of display 14 (particularly when display 14 is a touch screen display), and is often in contact with camera window 16 of FIG. 2 (e.g., when part of a user's hand overlaps window 16 when a user grips device 10). As a result, these surfaces may be prone to fingerprint smudging. To reduce or eliminate smudging, the surface of display cover layer 14', window 16, and/or button cover member 34 may be coated with an oleophobic material. The oleophobic material may be a material such as perfluoropolyether (PFPE) or other material with fluorocarbon chains (e.g., other fluoropolymer material) that resists smudging. The thickness of the oleophobic material may be 5-10 nm, more than 3 nm, more than 5 nm, more than 10 nm, more than 20 nm, less than 30 nm, less than 25 nm, less than 20 nm, less than 15 nm, less than 10 nm, or other suitable thickness.

Oleophobic coating layers formed from PFPE may have difficulties adhering directly to crystalline dielectric materials such as sapphire and zirconium oxide. Accordingly, an adhesion layer may be formed on the crystalline material before the oleophobic coating is deposited. The adhesion layer may be formed from an inorganic material such as silicon oxide, zirconium oxide, a mixture of silicon oxide and zirconium oxide, other oxides, a mixture of aluminum oxide and silicon oxide, or other inorganic materials. The thickness of the adhesion layer may be more than 1 nm, more than 3 nm, 5-10 nm, 3-15 nm, more than 5 nm, more than 10 nm, more than 20 nm, less than 30 nm, less than 25 nm, less than 20 nm, less than 15 nm, less than 10 nm, or other suitable thickness.

The adhesion layer may be annealed at 800° C., at more than 1000° C., at more than 1100° C., at more than 1200° C., at less than 1300° C., at less than 1200° C., at less than 1100° C., at less than 1000° C., at less than 900° C., at 1100-1300° C., or other suitable elevated temperature. The duration of the anneal may be more than 30 minutes, more than 1 hour, more than 2 hours, 1-3 hours, less than 3 hours, less than 2 hours, or other suitable duration. The annealing process may help densify and lower the surface roughness of the adhesion layer. For example, the surface roughness of a silicon oxide adhesion layer may decrease from 0.25 nm RMS (root mean squared) to a value less than 0.2 nm RMS such as 0.12 nm RMS after annealing (as an example). The annealing process may also help densify and harden the adhesion layer. Reduced surface roughness, increased densification, and increased hardness may help enhance adhesion promotion performance and oleophobic coating robustness, making the coated transparent member more resistant to wear.

An adhesion layer may be deposited as a blanket film of a single material (e.g., a layer of silicon oxide). If desired, the adhesion layer may be graded to help match the properties of the adhesion layer to underlying substrate material and to the subsequently deposited oleophobic layer.

Figure 4:
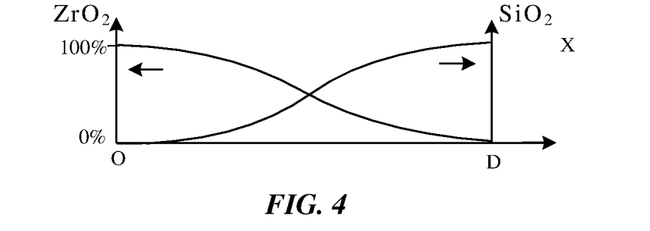
FIG. 4 is a graph showing how the composition of an oleophobic coating adhesion layer may vary through the layer in accordance with an embodiment.

Consider, as an example, a scenario in which the transparent crystalline material on which the adhesion layer is being deposited is a zirconium oxide member. To promote material matching and thereby adhesion between the adhesion layer and the zirconium oxide member, the adhesion layer may have a composition that varies as a function of position within the adhesion layer. The composition of an illustrative graded adhesion layer of the type that may be deposited on a zirconium oxide structure is shown in the graph of FIG. 4. At position x=0, the adhesion layer forms an interface with the underlying zirconium oxide member. At this interface, the composition of the graded adhesion layer may be 100% zirconium oxide or may have another zirconium-oxide-rich composition to promote matching and adhesion between the adhesion layer and the zirconium oxide member. At increasing distances x through the adhesion layer away from the interface between the adhesion layer and the zirconium oxide member, the fraction of zirconium oxide in the adhesion layer decreases and the fraction of silicon oxide in the adhesion layer increases by a corresponding amount. At the upper surface of the adhesion layer (x=D in the example of FIG. 4, where the adhesion layer will form an interface with the oleophobic layer), the adhesion layer may be formed from 100% silicon oxide or may have another silicon-oxide-rich composition, which exhibits good adhesion with oleophobic material.

In general, any suitable composition may be used for the annealed adhesion layer. The adhesion layer may, for example, be formed from a uniform layer of a single inorganic material such as silicon oxide, may be formed from an inorganic material with a graded composition such as a mixture of zirconium oxide and silicon oxide of the type described in connection with FIG. 4, a mixture of aluminum oxide and silicon oxide that has an aluminum-oxide-rich portion to help adhere the adhesion layer to an underlying crystalline aluminum oxide (sapphire) member and that has a silicon-oxide-rich portion to adhere to the oleophobic coating, or other suitable material formed from one or more inorganic materials or other materials that promote adhesion of the oleophobic coating to an underlying crystalline structure.

Figure 5:
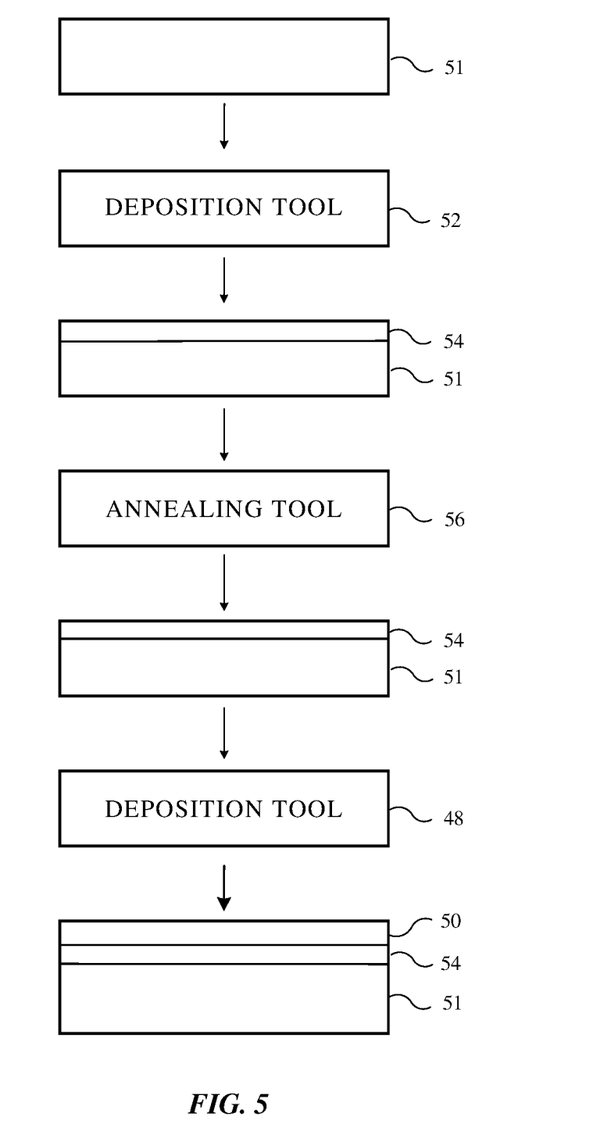
FIG. 5 is a diagram of illustrative equipment and operations involved in forming an electronic device structure with an adhesion layer and oleophobic coating in accordance with an embodiment.

FIG. 5 is a diagram of illustrative equipment and operations that may be used to form an oleophobic coating on a crystalline structure such as a transparent crystalline member serving as a display cover layer, button cover layer, or window for a camera or other light-based device.

As shown in FIG. 5, deposition tool 52 may be used to deposit thin-film adhesion layer 54 on transparent crystalline member 51 (e.g., a transparent crystalline structure for a display cover layer, button cover layer, a window or other suitable crystalline substrate). Member 51 may be a planar layer of material or other suitable structure. Deposition tool 52 may be a sputtering tool, an evaporator, other physical vapor deposition equipment, a chemical vapor deposition tool, or other equipment for depositing layer 54. The thickness of adhesion layer 54 may be more than 1 nm, more than 3 nm, 5-10 nm, 3-15 nm, more than 5 nm, more than 10 nm, more than 20 nm, less than 30 nm, less than 25 nm, less than 20 nm, less than 15 nm, less than 10 nm, or other suitable thickness. Adhesion layer 54 may be formed from silicon oxide, a graded mixture of aluminum oxide and silicon oxide (e.g., when member 51 is a crystalline aluminum oxide layer), a graded mixture of zirconium oxide and silicon oxide (e.g., when member 51 is a zirconium oxide layer), other inorganic materials, or other adhesion promotion materials. The exposed upper surface of layer 54 may be formed from a material such as silicon oxide that exhibits satisfactory adhesion to oleophobic materials. The lower surface of layer 54 at the interface between layer 54 and member 51 may, if desired, have a composition that matches that of member (e.g., layer 54 may be rich in aluminum oxide or may be graded to include only aluminum oxide at the interface with member 51 when member 51 is formed from aluminum oxide, may be rich in zirconium oxide or may be graded to include only zirconium oxide at the interface with member 51 when member 51 is formed from zirconium oxide, etc.).

To enhance the properties of layer 54, member 51 and layer 54 may be annealed using annealing tool 56. Annealing tool 56 may be a furnace or other tool that can heat member 51 and layer 54 to an elevated temperature such as 1200° C., more than 1100° C., less than 1500° C., 1100-1300° C., or other suitable temperature. The temperature to which member 51 and layer 54 are heated during annealing is preferably below the melting point of member 51 (e.g., less than 1600° C.) while being sufficiently high to densify layer 54, decrease surface roughness of layer 54, and otherwise enhancing the ability of layer 54 to form a robust adhesion layer for subsequent oleophobic coating material. Member 51 and layer 54 may be annealed for 2 hours, more than 30 minutes, more than 1 hour, less than 3 hours, less than 4 hours, or for other suitable amounts of time.

Following annealing, deposition tool 48 may be used to deposit oleophobic coating layer 50 on layer 54. Oleophobic coating 50 may be formed from a material such as perfluoropolyether (PFPE) or other material with fluorocarbon chains that help coating 50 resist smudging. The thickness of the deposited oleophobic material may be 5-10 nm, more than 3 nm, more than 5 nm, more than 10 nm, more than 20 nm, less than 30 nm, less than 25 nm, less than 20 nm, less than 15 nm, less than 10 nm, or other suitable thickness.

Figure 6:
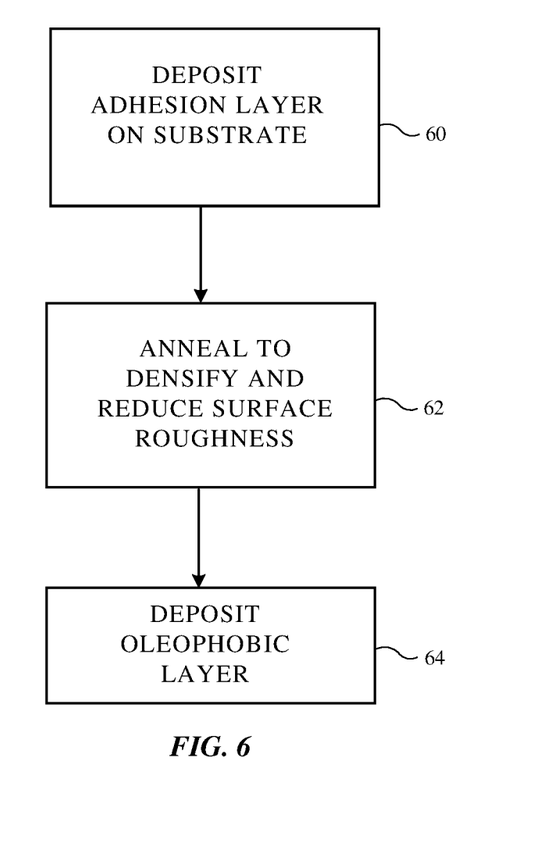
FIG. 6 is a flow chart of illustrative steps involved in forming an oleophobic coating on an electronic device structure in accordance with an embodiment.

FIG. 6 is a flow chart of illustrative operations involved in forming an oleophobic coating on a crystalline substrate such as a sapphire member, zirconium oxide member, or other transparent dielectric crystalline member.

At step 60, adhesion layer 54 may be deposited on member 51 using deposition tool 52 (FIG. 5). Layer 54 may be uniform layer of adhesion promotion material or may be a graded layer containing a mixture of materials that vary in composition as a function of position throughout the layer. Layer 54 may, as an example, include an inorganic adhesion promotion material such as silicon oxide.

At step 62, annealing tool 56 (FIG. 5) may be used to anneal layer 54, thereby densifying and smoothing layer 54 and enhancing the robustness and adhesion-promotion performance of layer 54.

At step 64, deposition tool 48 (FIG. 5) may be used to deposit a layer of oleophobic material such as perfluoropolyether or other fluorocarbon material (e.g., other fluoropolymers) on annealed adhesion layer 54, thereby forming oleophobic coating 50 on annealed adhesion layer 54.

Following deposition of oleophobic coating 50, member 51 may be used in forming a display cover member, a button cover member (e.g., a cap on a plastic button member, etc.), a camera window member for a camera or a transparent window member for other light-based devices, or other structure in electronic device 10.

The foregoing is merely illustrative and various modifications can be made to the described embodiments. The foregoing embodiments may be implemented individually or in any combination.

What is claimed is:

1. An electronic device, comprising:
   a housing;
   a transparent crystalline member in the housing;
   an oleophobic coating over the transparent crystalline member; and
   an annealed adhesion layer on the crystalline member, wherein the oleophobic coating is formed on the annealed adhesion layer, wherein the annealed adhesion layer comprises a graded mixture of first and second inorganic materials and wherein the first and second inorganic materials vary in composition as a function of position throughout the annealed adhesion layer from an interface between the annealed adhesion layer and the transparent crystalline member to an interface between the annealed adhesion layer and the oleophobic coating.

2. The electronic device defined in claim 1 further comprising:
   a component in the housing that is overlapped by the transparent crystalline member.

3. The electronic device defined in claim 2 wherein one of the first and second organic materials is silicon oxide.

4. The electronic device defined in claim 3 wherein the annealed adhesion layer has a surface roughness of less than 0.2 nm RMS.

5. The electronic device defined in claim 4 wherein the transparent crystalline member comprises a transparent crystalline member selected from the group consisting of: a display cover member, a button cover member, and a camera window member.

6. The electronic device defined in claim 1 wherein the second inorganic material is silicon oxide.

7. The electronic device defined in claim 6 wherein the first inorganic material comprises an inorganic material selected from the group consisting of: aluminum oxide and zirconium oxide.

8. The electronic device defined in claim 1 wherein the graded mixture contains more of the first inorganic material than the second inorganic material at an interface between the annealed adhesion layer and the transparent crystalline member and wherein the graded mixture contains more of the second inorganic material than the first inorganic material at an interface between the annealed adhesion layer and the oleophobic coating.

9. The electronic device defined in claim 8 wherein the annealed adhesion layer has a surface roughness of less than 0.2 nm RMS.

10. The electronic device defined in claim 9 wherein the transparent crystalline member comprises a transparent crystalline member selected from the group consisting of: a display cover member, a button cover member, and a camera window member.

11. The electronic device defined in claim 2 wherein the component comprises a display and wherein the transparent crystalline member comprises a transparent display cover layer that overlaps the display.

12. The electronic device defined in claim 2 wherein the component comprises a camera and wherein the transparent crystalline member comprises a transparent camera window that overlaps the camera.

13. The electronic device defined in claim 2 wherein the component comprises a button and wherein the transparent crystalline member comprises a transparent button cover layer for the button.

14. The electronic device defined in claim 2 wherein the oleophobic coating includes fluorocarbon chains.

15. An electronic device, comprising:
   a housing;
   a camera in the housing; and
   a transparent camera window in the housing that overlaps the camera, wherein the transparent camera window comprises:
   a transparent crystalline member;
   an oleophobic coating over the transparent crystalline member; and
   an annealed inorganic adhesion layer on the crystalline member, wherein the oleophobic coating is formed on the annealed inorganic adhesion layer, wherein the annealed adhesion layer comprises a graded mixture of first and second inorganic materials and wherein the first and second inorganic materials vary in composition as a function of position throughout the annealed adhesion layer from an interface between the annealed adhesion layer and the transparent crystalline member to an interface between the annealed adhesion layer and the oleophobic coating.

16. The electronic device defined in claim 15 wherein the annealed inorganic adhesion layer has a surface roughness of less than 0.2 nm RMS.

17. An electronic device, comprising:
a housing;
a component in the housing; and
a transparent crystalline member that overlaps the component;
an annealed inorganic adhesion layer having a graded mixture of first and second inorganic materials, wherein the graded mixture contains more of the first inorganic material than the second inorganic material at an interface between the annealed inorganic adhesion layer and the transparent crystalline member and wherein the graded mixture contains more of the second inorganic material than the first inorganic material at an interface between the annealed inorganic adhesion layer and an oleophobic coating.

18. The electronic device defined in claim 17 wherein the component comprises a component selected from the group consisting of: a display, a button, and a camera, wherein the oleophobic coating comprises perfluoropolyether.

* * * * *

UNITED STATES PATENT AND TRADEMARK OFFICE
CERTIFICATE OF CORRECTION

PATENT NO. : 10,348,943 B2
APPLICATION NO. : 15/218768
DATED : July 9, 2019
INVENTOR(S) : Matthew S. Rogers, Naoto Matsuyuki and Que Anh S. Nguyen It is certified that error appears in the above-identified patent and that said Letters Patent is hereby corrected as shown below:

In the Claims

Column 9, Line 21, "coating." should read -- coating formed on the annealed inorganic adhesion layer. --

Signed and Sealed this
Eighteenth Day of February, 2020

Andrei Iancu
*Director of the United States Patent and Trademark Office*